United States Patent [19]

Dixon et al.

[11] Patent Number: 4,637,024
[45] Date of Patent: Jan. 13, 1987

[54] REDUNDANT PAGE IDENTIFICATION FOR A CATALOGUED MEMORY

[75] Inventors: Jerry D. Dixon, Boca Raton; Robert H. Farrell, Coral Springs; Gerald A. Marazas, Boca Raton; Andrew B. McNeill, Jr., Deerfield Beach; Gerald U. Merckel, Delray, all of Fla.

[73] Assignee: International Business Machines Corporation, Armonk, N.Y.

[21] Appl. No.: 667,520

[22] Filed: Nov. 2, 1984

[51] Int. Cl.⁴ .............................................. G06F 11/00
[52] U.S. Cl. ...................................... 371/67; 364/200
[58] Field of Search .................. 371/24, 25, 67, 71; 364/200, 900

[56] References Cited

U.S. PATENT DOCUMENTS

| | | | |
|---|---|---|---|
| 3,840,862 | 10/1974 | Ready | 364/200 |
| 3,896,419 | 7/1975 | Lange et al. | 364/200 |
| 3,976,865 | 8/1976 | Enger | 371/67 |
| 4,084,236 | 4/1978 | Chelberg et al. | 364/200 |
| 4,190,885 | 2/1980 | Joyce et al. | 364/200 |
| 4,197,580 | 4/1980 | Chang et al. | 364/200 |
| 4,225,922 | 9/1980 | Porter | 364/200 |
| 4,357,656 | 11/1982 | Saltz et al. | 364/200 |
| 4,476,526 | 10/1984 | Dodd | 364/200 |
| 4,490,782 | 12/1984 | Dixon et al. | 364/200 |

*Primary Examiner*—Charles E. Atkinson
*Attorney, Agent, or Firm*—Sughrue, Mion, Zinn, Macpeak, and Seas

[57] ABSTRACT

A redundant error-detecting addressing code for use in a cache memory. A directory converts logical data addresses to physical addresses in the cache where the data is stored in blocks. The blocks are expanded to include redundant addressing information such as the logical data address and the physical cache address. When a block is accessed from the cache, the redundant addressing is compared to the directory addressing information to confirm that the correct data has been accessed.

9 Claims, 5 Drawing Figures

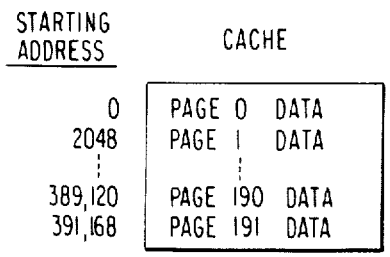
FIG. 2
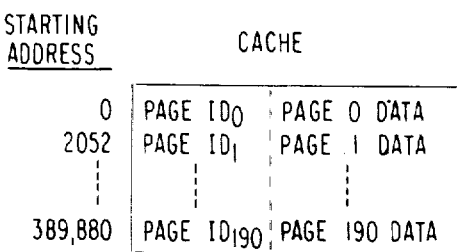
FIG. 3
FIG. 4
PAGE ID (4 BYTES)
BYTE 0 — PHYSICAL CACHE PAGE (0 – 190)
BYTES 1-3 —
BITS 0-4 = 0
BITS 5-6 = DISK DRIVE #
BITS 7-23 = BLOCK RBA
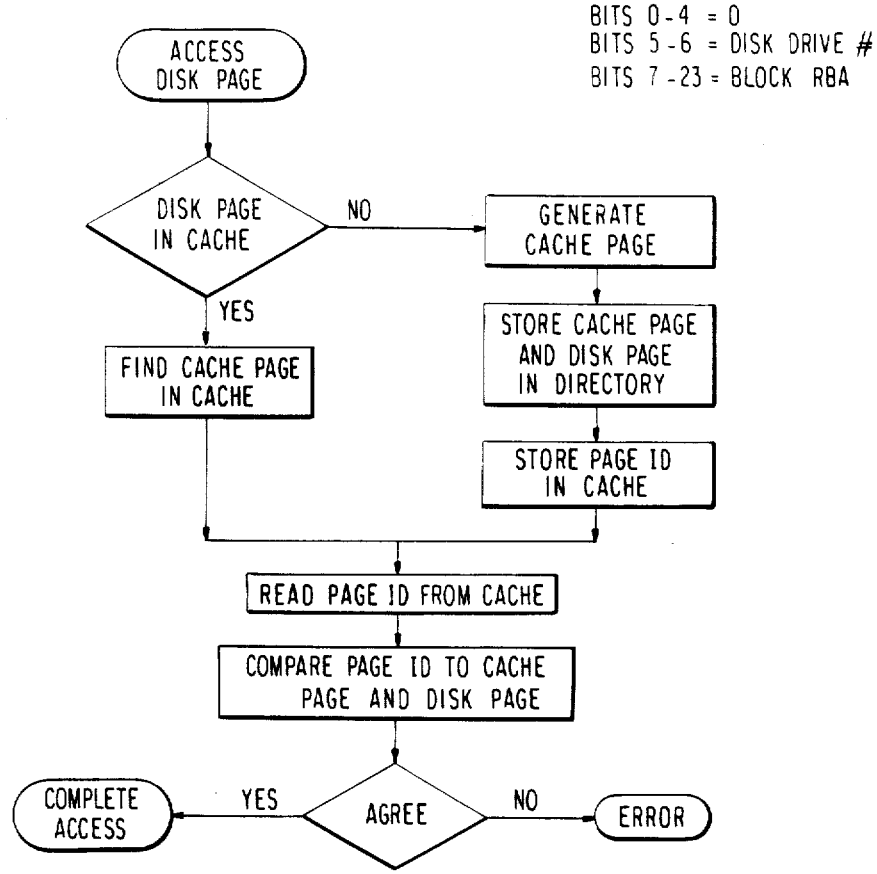
FIG. 5

REDUNDANT PAGE IDENTIFICATION FOR A CATALOGUED MEMORY

BACKGROUND OF THE INVENTION

The invention relates generally to the organization of a computer memory. In particular, the invention relates to redundant page identification for a catalogued memory for the purposes of error checking.

Computer systems typically access their memories by the address of the memory. In a simple computer memory, each storage location has a unique address so that when the contents of the memory are accessed, either for reading or for writing, the computer provides an address which is uniquely associated with the desired location. More sophisticated computer memory systems, however, make use of a catalogued memory. By a catalogued memory is meant that a physical memory location in the catalogued memory is at one time assigned to data of one address and at another time to data of a different address. An additional memory, called a directory, is then included in the memory system to provide the correspondence between the physical memory location and the address of the desired data. Thus when a processor desires access to the catalogued memory, it first consults the directory to determine at which physical location in the catalogued memory the addressed data is currently stored. The most common example of a catalogued memory is a cache memory. A cache memory is typically a relatively fast memory that is associated with a much larger but considerably slower mass memory. Large blocks of data, often in the form of pages of 2048 bytes, are transferred from the mass memory to the cache memory. The directory contains the information about where in the cache memory the addressed locations in the mass memory are being stored. Thereafter, the processor, when desiring to access memory, accesses the fast cache memory rather than the slower mass memory. At some point, the contents of the cache memory are transferred to the mass memory and that area of the cache can be used for another page of mass memory once the directory has been updated.

A recent development in computer architecture is to add a cache memory to a disk memory. The disk cache serves a dual purpose. It acts as a buffer between the slow disk and the fast computer bus and it additionally can be randomly accessed by the processor wtihout the need for an independent access to the much slower disk. Such a disk cache is disclosed in U.S. patent application No. 270,951, filed by Dixon et al. on June 5, 1981 and which has issued as U.S. Pat. No. 4,490,782 on Dec. 25, 1984. This application is incorporated herein by reference.

A computer system with a disk cache is illustrated in the block diagram of FIG. 1. A processor has associated therewith a main storage memory 12 of semiconductor memory chips. An I/O channel 14 connects the processor 10 to a plurality of keyboard and display terminals 16 and to an I/O controller 18 that supports four disk units 20, each with a capacity of 200 megabytes. Management of the data storage and data flow between the disk 20 and the processor 10 is provided by a microcomputer 22 using a control program in its read-only storage 24 and further using the random access memory 26.

A handshake logic 28 provides for the interaction between the microprocessor 22 and the processor 10 while a similar handshake logic 30 provides a similar interaction with the disk units 20.

Handshake logic is a means for resolving requests from several sources to use a single data transfer path. One or more of the several sources may, at the same point in time, request permission to use the path. A given central control device in the handshake logic resolves these conflicting requests and grants permission as to which device is allowed to use the data transfer path. The particular priority scheme used in granting access is immaterial to this invention. Once permission has been granted to a particular device, it proceeds to transfer the data. Thus data transfer from a device is always proceeded by a request by the device and a following permission to the device. The handshake logic 28 and 30 may be implemented in a variety of ways well known to those in the art.

The microprocessor 22 controls the logic of the I/O controller 18 through high speed control hardware 32. Data is buffered between the I/O controller 18 and the I/O channel 14 by a data register 34 with another data register 36 providing buffering to the disk units 20. For those applications where caching is not desired, data may be transferred directly between the processor 10 and one of the disk units 20 by way of the data registers 34 and 36, interconnected by a interconnecting bus 38. A semiconductor cache store 40, having a capacity of 384 kilobytes is connected through its own data register 42 to the data registers 34 and 36 by additional interconnecting data buses 44 and 46. Part of the random access memory 26 is devoted to a directory for the pages of the memory space of the disk units 20 currently stored in the cache 40. Of course, other types of cache controllers are possible, such as that disclosed by Porter in U.S. Pat. No. 4,225,922.

In a normal series of operations, the processor accesses a page from one of the disk units 20. That page and usually one or more neighboring pages are transferred from the addressed disk unit 20 into the cache 40. The one requested page is then further transferred from the cache 40 to the processor 10. On subsequent accesses, the directory in the random access memory 26 is consulted to ascertain if the requested page is currently in the cache 40. If so, the access is directly to the cache 40 with no physical access of the disk units 20.

At some point, the cache 40 is filled and further accesses to new pages in the disk units 20 will require that some of the pages in the cache 40 will need to be removed from the cache 40 to the proper disk unit 20. Dixon et al describes an efficient algorithm for determining which of the cached pages should be removed from the cache 40. Of course, when a page is removed from the cache 40 with another page taking its place, the directory in the random access memory 26 needs to be updated.

The 384 kilobyte cache store 40 has a capacity of 393,216 bytes of data and is organized, as illustrated in the table of FIG. 2, into pages of 2 kilobytes (2048 bytes). The 384 kilobyte cache 40 thus can contain 192 pages of data, with the pages arranged on binary boundaries. A total of 19 addressing bits are required to randomly access the cache store 40, as is required because data is transferred through the data registers 13, 34 and 36 a byte at a time. However, because of the binary boundary arrangement, that is, $2048 = 2^{11}$, the 8 high order addressing bits identify the page while the 11 low order addressing bits refer to the byte within the page.

This arrangement has obvious advantages for accessing an entire page, a byte at a time.

It should be emphasized that the page number illustrated in FIG. 2 is the cache page number. The directory contains a table that relates the cache page number to the disk page number, that is, the location in the disk units 20 from which the data in cache originated or to which it will be directed. Dixon et al in the previously cited patent provide an efficient organization for the directory that can be easily updated. It should be obvious that the directory is a crucial component for the described cache memory system since it provides the only means of correctly accessing data that has been cached.

The disk cache, illustrated in FIG. 1, can greatly speed up the flow of data between a disk file and the rest of the computer system. However, the use of cached data introduces a new type of system error. In modern computers, it is generally felt that the error margins on electronic signals are too low to allow the acceptance of an occasional unflagged and uncorrected error. Recorded data can be damaged by noise on data lines as well as media related defects during the writing, storage and reading periods. The problems of data errors have been attached in the past by using parity checking, CRC (cyclic redundancy checking) codes, and ECC (error correcting code). This type of checking and possibly correcting of errors has worked well in the past since the data path has been fairly short. Data buffers have been sequential in nature with little chance of changing the data sequence. However, the introduction of cache memories has resulted in the organization of data dependent upon catalogues or directories. All the data in the cache may have already been checked for parity and, if CRC or ECC is used, errors can be corrected. However, such error detection or correction in the data contributes nothing if the wrong page in the cache has been addressed. The data itself is error free. It is just the wrong data.

General testing of the operability of a cache are described by Joyce et al in U.S. Pat. No. 4,190,885 and by Saltz et al in U.S. Pat. No. 4,357,656. These methods involve a testing algorithm separate from normal accessing.

It is, of course, possible to provide error detection and possibly correction to the memory containing the directory. Shelberg et al. in U.S. Pat. No. 4,084,236 disclose the use of check bits for the addresses contained in the directory so that invalid addresses can be detected. Ready in U.S. Pat. No. 3,840,862 discloses the use of additional tags in the directory which can be used for detecting an invalid cache location. Chang et al. in U.S. Pat. No. 4,197,580 also disclose the use of validity bits in a directory although their validity bits indicate whether the contents of the directory are currently valid. Frananaszek in a technical article entitled "Partitioned Page Transfer from an Electronic Drum" appearing in the IBM Technical Disclosure Bulletin, vol. 25, no. 5, October 1982, at pp. 2621–2622 also discloses a type of validity bit in the directory. Error detection or correction codes applied to the contents of the directory are useful for eliminating errors introduced into the directory. However, electrical line noise may have caused the wrong address to be properly encoded in the directory or a correct address may be transmitted on a noisy line to the cache memory, resulting in a correct address accessing the wrong address in the cache. None of the above patents describe a method useful for detecting this type of error. Finally, the cache algorithm associated with the disk cache is very complex. There are too many possible code paths to allow an exhaustive testing of the code. As a result, there may be unknown code errors that result in an incorrrect correspondence between the directory and the cache.

SUMMARY OF THE INVENTION

Accordingly, it is an object of this invention to provide for the detection of an incorrect address applied to a catalogued memory.

It is a further object of this invention to provide the detection of incorrect addresses which will cover the maximum number of possible sources of errors.

The invention can be summarized as redundant addressing code for a catalogued memory. The contents of the memory are fully catalogued in a directory memory. However, each block of the catalogue memory has an additional address coding section that contains addressing information, partially or fully redundant to the information contained in the directory. When the catalogued memory is accessed, the proper block in the catalogue memory is obtained by consulting the directory. The redundant addressing code is then compared with the contents of the directory memory to ascertain that the correct block in the catalogue memory has been accessed.

BRIEF DESCRIPTION OF DRAWINGS

FIG. 2 is a table illustrating the organization of a conventional cache memory.

FIG. 3 is a table illustrating the memory organization of a cache memory utilizing the redundant address code of the present invention.

FIG. 4 is a table presenting one embodiment of the redundant address code of the present invention.

FIG. 5 is a flow diagram illustrating the use of the redundant address code.

DETAILED DESCRIPTION OF THE PREFERRED EMBODIMENTS

Figure 1:
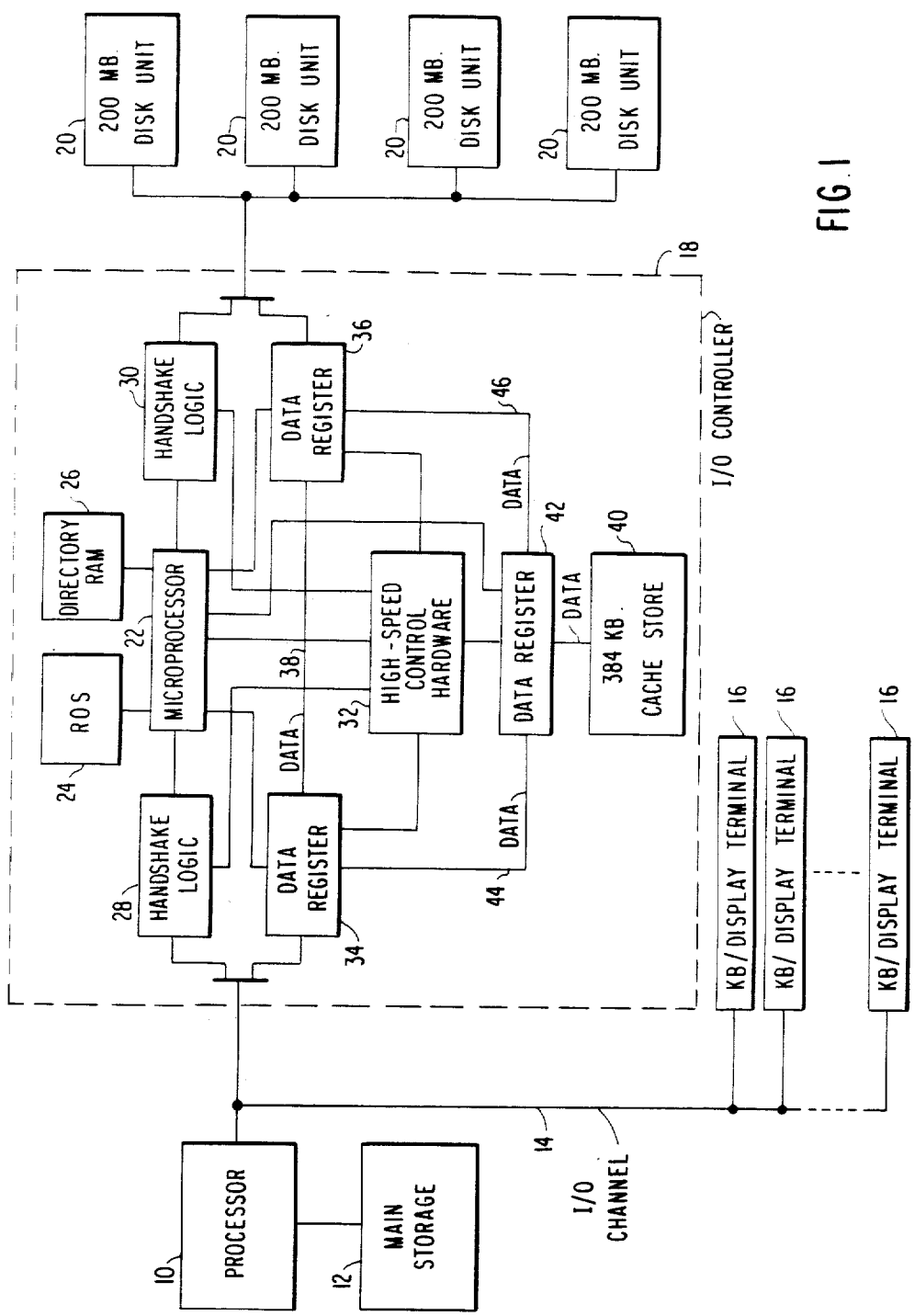
FIG. 1 is a block diagram of a computer system with a disk cache.

According to the present invention, every page of data stored in the cache memory has associated therewith a page identification that contains much of the same information stored in the directory for purposes of addressing the cache. The cache memory is organized according to the table given in FIG. 3. Each page contains 2 kilobytes (2048 bytes) of data. This data may itself contain error coding. However, the blocks within the cache are extended to further include, in an address coding subblock, a page ID that identifies the address of the page of data. In the preferred embodiment, the page ID is 4 bytes long and occupies the lowest address bytes of each block in the cache. As a result, each block is lengthened from 2048 bytes to 2052 bytes. For the same 384 KB cache 40 discussed before, the present invention reduces the number of pages available from 192 to 191, a reduction of ½%. A difficulty with the present invention is that the page boundaries are no longer at binary boundaries. As a result, a particular address in the highest 8 address lines to the cache memory do not necessarily refer to only one cached page. Therefore, cached data is now harder to index but the additional indexing work for the microprocessor 22 is relatively minor and results in almost no increase in cache algorithm time.

The format of a page ID is illustrated in FIG. 4. The lowest order byte, byte 0, identifies the physical cache page and in the described embodiment would be in the range of 0-190. It is to be recognized of course that the contents and the address of byte 0 are redundant if the address is correct. The contents of the page identification in that case are its address multiplied by 2052. If somehow, however, the page of data and its associated page identification were stored in the wrong block in the cache, then this correspondence would not be true.

The upper 3 bytes of the page identification correspond to the disk page. Bits of 0-4 of bytes 1-3 are set to 0. These bits are not necessary to express the disk page and they provide a minimal amount of error detection. Bits 5-6 identify the disk drive number of the 4 disk units 20. The 17 bits of bits 7-23 identify the relative block address (RBA) of the page or block.

The 17 bits of the RBA uniquely identify each block on any of the four 200 MB disk units 20. It should be noted that the RBA, as used in this application, differs somewhat from the RBA of Dixon et al in the previously cited patent. The RBA in Dixon et al included a designation of the disk unit 20 as well as a further designation of one of the 8 records within a block. Nonetheless, both of the RBAs serve to designate a physical storage location in the disk units 20.

The directory described by Dixon et al contains entries that point to both the cache page and the disk page. The disk page pointer in the directory of Dixon et al involves the use of additional indexed address blocks. For purposes of the present invention, it is sufficient to say that the directory can be used to store and retrieve the disk page pointer and the cache page pointer and to provide the correspondence between the two pointers. The entries further contain validity bits and pointers to other directory entries that allow an efficient updating of the directory. The important point, though, is that all meaningful information in the page ID is also contained in the directory and this page ID is fully redundant to the addressing information contained in the directory.

It is not essential to the concept of this invention that the page ID is fully redundant to the directory information for that page. For instance, if the page ID contains the disk number and the RBA of the page, then the page ID would nonetheless uniquely identify the address for the page of memory contained in the cache. Furthermore, it would be possible to further reduce the extent of the page ID to provide at least some error detection for the page address. However, such a reduced page ID would no longer uniquely identify the page address so that some possible errors would then be undetectable. The inclusion of the cache page in the page ID would allow for the detection of errors occurring in the generation of the cache page addresses contained in the directory.

By means of the invention, upon each access of the cache memory, the page ID is checked against the cache page and the disk page used in that cache access to determine that the correct cached data is being accessed. An example of the use of the page ID is illustrated in the flow diagram of FIG. 5. For simplicity, it is assumed that there are no direct accesses to the disk from the processor but that all accesses are done through the cache memory. The processor, in making the access, specifies the disk sector that is to be accessed. The microprocessor 22 in the I/O controller 18 then determines the disk page in which this sector resides, after which the microprocessor 22 consults the directory to determine if the disk page is currently resident in the cache. If the disk page is not in cache, the microprocessor generates an address for an available page in the cache and rearranges the directory to contain pointers to the cache page and the disk page in one of its entries. In order to make a cache page available, it is usually necessary to remove an existing page of data from the cache to the disk. Then the microprocessor 22 stores the page ID at the beginning of the block of cache that has been designated in the directory. The page ID is generated from the same information used to create the new entry in the directory.

If the disk page is already in the cache, the microprocessor 22 determines from the directory which cache page corresponds to the disk page. The preceeding determinations and rearrangements of the directory are described in the previously cited patent to Dixon et al.

With the cache page having been determined, the page ID is read from the location in the cache addressed by the cache page. The page ID is then compared to the cache page and the disk page. If all addressing and directory entries have been correctly made, the page ID will correspond to the cache page and the disk page. If agreement is determined, access is completed, with confidence that the correct data has been accessed in the cache. If, however, the page ID does not agree with either the cache page or the disk page, then there has been some type of error. The existence of the error is flagged to the application program for its own resolution of the problem. It would be possible to reconstruct a directory with the various page IDs. However, since a disagreement indicates an underlying problem which is likely to recur, it is felt that the application program should make the decision for subsequent action.

In any case, by means of comparing the addressing information with redundant codes stored at the address location in a cache memory, problems in either addressing, the directory or the microcode can be detected and the accessing of the wrong data in a cache memory can be prevented. In order to detect the maximum number of errors, it is recommended that the page ID be written early in the microcode process and then checked as late as possible in the processing so that any errors, whether in the microcode or in hardware, occurring the intervening period will be detected.

We claim:

1. A method of detecting addressing errors in a memory catalogued by a directory, said memory divided into a plurality of blocks for the storage of data information, said information addressed by a first address, said block addressed by a second address, said directory providing the correspondence between said first address and said second address, comprising the steps of:

storing in a first portion of one of said blocks, addressed by said second address, data addressed by said first address;

storing in a second portion of said one of said blocks addressing information derived from said first and second addresses;

initiating an access to data in said catalogued memory according to said first address;

converting said first address to said second address according to said directory;

reading said second portion addressed by said second address; and comparing said read second portion with said first and second addresses used for said converting and reading steps.

2. A method as recited in claim 1, further comprising the steps of:
signalling an error condition if said comparing step indicates a disagreement between said read second portion and said first and second addresses used for said reading and converting steps; and
completing said initiated access to said second portion if said comparing step does not indicate said disagreement.

3. A method as recited in claim 1, wherein said addressing information comprises the first address from which said addressing information is derived.

4. A method as recited in claim 3, wherein said addressing information further comprises the second address from which said addressing information is derived.

5. A catalogued memory system, comprising:
a catalogued memory for storing data information addressed by a first set of addresses and divided into blocks addressed by a second set of addresses, said data information being stored in a first portion of one of said blocks;
a directory memory for storing information relating said first set of addresses in said first set to a second address in said second set;
means connected to said directory memory for converting a first address in said first set to second address in said second set in accordance with said information stored in said directory memory; and
means connected to said converting means and said catalogued memory addressed by said second address addressing information derived from said first and second addresses.

6. A catalogued memory system as recited in claim 5, further comprising means connected to said catalogued memory for reading said second portion and comparing it with said first and second addresses used in said reading.

7. A catalogued memory system as recited in claim 5, wherein said addressing information comprises said first address.

8. A catalogued memory system as recited in claim 7, wherein said addressing information further comprises said second address.

9. A catalogued memory system as recited in claim 6, wherein said catalogued memory is a cache memory and said addressing information comprises said first and second addresses.

* * * * *